US 10,665,870 B2

(12) United States Patent
Sato et al.

(10) Patent No.: US 10,665,870 B2
(45) Date of Patent: May 26, 2020

(54) ELECTROCHEMICAL REACTION UNIT AND FUEL CELL STACK

(71) Applicant: MORIMURA SOFC TECHNOLOGY CO., LTD., Komaki-shi, AIchi (JP)

(72) Inventors: Yoshiaki Sato, Komaki (JP); Makoto Kuribayashi, Ichinomiya (JP); Tomoki Murata, Komaki (JP); Takahiro Masumoto, Komaki (JP); Tomoo Tanaka, Kitanagoya (JP)

(73) Assignee: MORIMURA SOFC TECHNOLOGY CO., LTD., Komaki-shi, Aichi (JP)

( * ) Notice: Subject to any disclaimer, the term of this patent is extended or adjusted under 35 U.S.C. 154(b) by 12 days.

(21) Appl. No.: 15/560,089

(22) PCT Filed: Mar. 26, 2016

(86) PCT No.: PCT/JP2016/059214
§ 371 (c)(1),
(2) Date: Sep. 20, 2017

(87) PCT Pub. No.: WO2016/152923
PCT Pub. Date: Sep. 29, 2016

(65) Prior Publication Data
US 2018/0076468 A1    Mar. 15, 2018

(30) Foreign Application Priority Data
Mar. 26, 2015  (JP) ................. 2015-064315

(51) Int. Cl.
*H01M 8/0245* (2016.01)
*H01M 8/0236* (2016.01)
(Continued)

(52) U.S. Cl.
CPC ............. *H01M 8/0245* (2013.01); *C25B 1/04* (2013.01); *H01M 8/02* (2013.01); *H01M 8/0202* (2013.01);
(Continued)

(58) Field of Classification Search
CPC ............. H01M 8/0245; H01M 8/0656; H01M 8/0236; H01M 8/0247; H01M 8/241;
(Continued)

(56) References Cited

U.S. PATENT DOCUMENTS

2005/0019642 A1    1/2005  Hishitani et al.
2011/0052916 A1*   3/2011  Ohmori ............... H01M 8/0282
                                                    428/402
(Continued)

FOREIGN PATENT DOCUMENTS

DE    10 2007 058 907 A1    6/2009
JP         2015-28888 A     2/2005
(Continued)

OTHER PUBLICATIONS

English Machine translation of JP 2013-239330 (Year: 2013).*
(Continued)

*Primary Examiner* — Lisa S Park
(74) *Attorney, Agent, or Firm* — Sughrue Mion, PLLC

(57) ABSTRACT

An electrochemical reaction unit including a single cell including an electrolyte layer containing solid oxide, and a cathode and an anode which face each other in a first direction with the electrolyte layer intervening therebetween; a current collector disposed on a cathode side of the single cell and having a protrusion protruding toward the cathode; an electrically conductive coat covering a surface of the current collector; and an electrically conductive bonding layer bonding the cathode and the protrusion covered with the coat. In all sections of the protrusion taken in
(Continued)

parallel with the first direction, a corner portion of the protrusion covered with the coat is covered with the bonding layer.

10 Claims, 11 Drawing Sheets

(51) Int. Cl.
| | |
|---|---|
| *H01M 8/0247* | (2016.01) |
| *H01M 8/0656* | (2016.01) |
| *H01M 8/1231* | (2016.01) |
| *H01M 8/241* | (2016.01) |
| *G02B 1/04* | (2006.01) |
| *H01M 8/12* | (2016.01) |
| *H01M 8/02* | (2016.01) |
| *H01M 8/0202* | (2016.01) |
| *C25B 1/04* | (2006.01) |
| *H01M 8/124* | (2016.01) |

(52) U.S. Cl.
CPC ....... *H01M 8/0236* (2013.01); *H01M 8/0247* (2013.01); *H01M 8/0656* (2013.01); *H01M 8/12* (2013.01); *H01M 8/1231* (2016.02); *H01M 8/241* (2013.01); *H01M 2008/1293* (2013.01); *H01M 2300/0071* (2013.01); *Y02E 60/366* (2013.01)

(58) Field of Classification Search
CPC .... H01M 8/1231; H01M 8/02; H01M 8/0202; H01M 8/12; H01M 2008/1293; H01M 2300/0071; C25B 1/04; Y02E 60/366
See application file for complete search history.

(56) References Cited

U.S. PATENT DOCUMENTS

| | | | |
|---|---|---|---|
| 2011/0111327 A1* | 5/2011 | Ohmori | H01M 8/021 |
| | | | 429/520 |
| 2014/0178795 A1 | 6/2014 | Kim et al. | |
| 2014/0227621 A1* | 8/2014 | Fujita | H01M 8/241 |
| | | | 429/456 |
| 2015/0349349 A1 | 12/2015 | Ohmori et al. | |

FOREIGN PATENT DOCUMENTS

| | | |
|---|---|---|
| JP | 2009-4297 A | 1/2009 |
| JP | 2010-92877 A | 4/2010 |
| JP | 2010-157387 A | 7/2010 |
| JP | 2011-9065 A | 1/2011 |
| JP | 2011-99159 A | 5/2011 |
| JP | 2011-105582 A | 6/2011 |
| JP | 2011-108621 A | 6/2011 |
| JP | 2013-239330 A | 11/2013 |
| JP | 2014-41705 A | 3/2014 |
| JP | 2014-207146 A | 10/2014 |
| JP | 2015-28887 A | 2/2015 |

OTHER PUBLICATIONS

Korean Office Action dated Sep. 29, 2018 issued by the Korean Intellectual Property Office in counterpart Application No. 10-2017-7025990.
International Search Report dated Jun. 14, 2016, issued by the International Searching Authority in counterpart International Patent Application No. PCT/JP2016/059214 (PCT/ISA/210).
Communication dated Sep. 5, 2018, issued by the European Patent Office in counterpart European Application No. 16768826.6.

\* cited by examiner

ELECTROCHEMICAL REACTION UNIT AND FUEL CELL STACK

TECHNICAL FIELD

A technique disclosed in the present specification relates to an electrochemical reaction unit.

BACKGROUND ART

A known type of a fuel cell for generating electricity by utilizing electrochemical reaction between hydrogen and oxygen is a solid oxide fuel cell (hereinafter, also called "SOFC") which has electrolyte layers containing solid oxide. A fuel cell electricity generation unit (hereinafter, may be called merely "electricity generation unit"), which is the smallest unit of electricity generation of SOFC, has a single cell which includes an electrolyte layer and mutually facing cathode and anode with the electrolyte layer intervening therebetween, and electrically conductive current collectors disposed respectively on a cathode side and on an anode side of the single cell and adapted to collect electricity generated in the single cell. Generally, the current collector disposed on the cathode side of the single cell has protrusions protruding toward the cathode. The cathode and the protrusions of the current collector are bonded together by an electrically conductive bonding layer, whereby the cathode and the current collector are electrically connected.

The current collector disposed on the cathode side of the single cell is formed of, for example, a metal which contains Cr (chromium), such as ferritic stainless steel. When such a current collector is exposed to an atmosphere of a high temperature of, for example, 700° C. to 1,000° C. in the course of operation of SOFC, there may arise a phenomenon called "Cr diffusion" in which Cr is emitted from the surface of the current collector and diffused. When Cr diffusion occurs, the current collector may be unusually oxidized due to lack of Cr, and adhesion of diffused Cr to the surface of the cathode may cause a phenomenon called "Cr poisoning of cathode" in which the electrode reaction rate in the cathode deteriorates. In order to restrain Cr diffusion, there is known a technique in which the surface of the current collector is covered with an electrically conductive coat (see, for example, Patent Document 1).

PRIOR ART DOCUMENT

Patent Document

Patent Document 1: Japanese Patent Application Laid-Open (kokai) No. 2011-99159

SUMMARY OF THE INVENTION

Problem to be Solved by the Invention

A corner portion of the protrusion of the current collector has a larger number of surfaces as compared with the other portion of the protrusion. Also, the thickness of a coat which covers the protrusion is apt to become thin at the corner portion. As a result, Cr diffusion is more likely to occur at the corner portion of the protrusion of the current collector than at the other portion of the protrusion. Accordingly, merely covering the surface of the current collector with a coat as in the case of the above-mentioned conventional technique fails to sufficiently restrain Cr diffusion from the corner portion of the protrusion of the current collector.

Such a problem is common with an electrolysis cell unit, which is the smallest unit of a solid oxide electrolysis cell (hereinafter, may be called "SOEC") for generating hydrogen by utilizing electrolysis of water. In the present specification, an electricity generation unit and an electrolysis cell unit are collectively called an electrochemical reaction unit.

The present specification discloses a technique capable of solving the above problem.

Means for Solving the Problem

A technique disclosed in the present specification can be implemented, for example, in the following modes.

(1) An electrochemical reaction unit disclosed in the present specification comprises a single cell including an electrolyte layer containing solid oxide, and a cathode and an anode which face each other in a first direction with the electrolyte layer intervening therebetween; a current collector disposed on a cathode side of the single cell and having a protrusion protruding toward the cathode; an electrically conductive coat covering a surface of the current collector; and an electrically conductive bonding layer bonding the cathode and the protrusion covered with the coat. The electrochemical reaction unit is characterized in that in all sections of the protrusion taken in parallel with the first direction, a corner portion of the protrusion covered with the coat is covered with the bonding layer. According to the present electrochemical reaction unit, since the corner portion of the protrusion of the current collector is covered with the bonding layer along the entire perimeter thereof, there can be effectively restrained Cr diffusion from the corner portion of the protrusion which could otherwise be likely to occur because of large surface area and susceptibility to thinning of the coat.

(2) The above electrochemical reaction unit may be configured such that the current collector has a plurality of the protrusions and such that in all sections of each of the plurality of protrusions taken in parallel with the first direction, the corner portion of the protrusion covered with the coat is covered with the bonding layer. According to the present electrochemical reaction unit, since the corner portions of the plurality of protrusions of the current collector are covered with the respective bonding layers along the respective entire perimeters, Cr diffusion from the corner portions of the protrusions can be more effectively restrained.

(3) The above electrochemical reaction unit may be configured such that the coat and the bonding layer are formed of a spinel oxide. According to the present electrochemical reaction unit, since the bonding layer in addition to the coat is formed of a spinel oxide highly effective at restraining Cr diffusion, Cr diffusion from the corner portion of the protrusion of the current collector can be more effectively restrained. Also, since the heat treatment temperature can be lowered as compared with the case where the coat and the bonding layer are formed of other materials such as a perovskite-type oxide, Cr diffusion from the corner portion of the protrusion of the current collector can be more effectively restrained. Further, since both of the coat and the bonding layer are formed of a spinel oxide, a difference in thermal expansion between the coat and the bonding layer can be reduced, whereby the occurrence of cracking in the interface between the coat and the bonding layer caused by the difference in thermal expansion can be restrained. Also, as compared with the case where the coat and the bonding layer are formed of other materials, the coat and the bonding layer can be lowered in electric resistance.

(4) The above electrochemical reaction unit may be configured such that the coat and the bonding layer are formed of a spinel oxide which contains at least one of Zn, Mn, Co, and Cu. According to the present electrochemical reaction unit, since a spinel oxide which contains at least one of Zn, Mn, Co, and Cu can maintain a spinel structure for a long period of time even in a relatively high temperature environment, as a result of the coat and the bonding layer being formed of such a spinel oxide, the effect of restraining Cr diffusion from the corner portion of the protrusion of the current collector and the effect of lowering electric resistance can be maintained for a long period of time.

(5) The above electrochemical reaction unit may be configured such that the coat and the bonding layer are formed of respective spinel oxides which contain the same main component elements. According to the present electrochemical reaction unit, since the coat and the bonding layer are formed of respective spinel oxides which contain the same main component elements, a difference in thermal expansion between the coat and the bonding layer can be more reduced, whereby the occurrence of cracking in the interface between the coat and the bonding layer caused by the difference in thermal expansion can be restrained more effectively.

(6) The above electrochemical reaction unit may be configured such that in all sections of the protrusion taken in parallel with the first direction, the bonding layer is greater in average thickness than the coat, as measured on a line segment connecting a point closest to the cathode on the corner portion of the protrusion and a surface of the cathode along a shortest distance and such that the coat is lower in porosity than the bonding layer. According to the present electrochemical reaction unit, since the bonding layer higher in porosity than the coat is greater in average thickness than the coat, the effect of absorbing stress can be enhanced, whereby the occurrence of cracking in the interface between the coat and the bonding layer can be restrained more effectively.

The technique disclosed in the present specification can be implemented in various modes; for example, a fuel cell electricity generation unit, a fuel cell stack having a plurality of fuel cell electricity generation units, an electricity generation module having a fuel cell stack, a fuel cell system having an electricity generation module, an electrolysis cell unit, an electrolysis cell stack having a plurality of electrolysis cell units, a hydrogen generation module having an electrolysis cell stack, and a hydrogen generation system having a hydrogen generation module.

MODES FOR CARRYING OUT THE INVENTION

A. Embodiment

A-1. Basic Structure of Apparatus
(Structure of Fuel Cell Stack 100)

Figure 1:
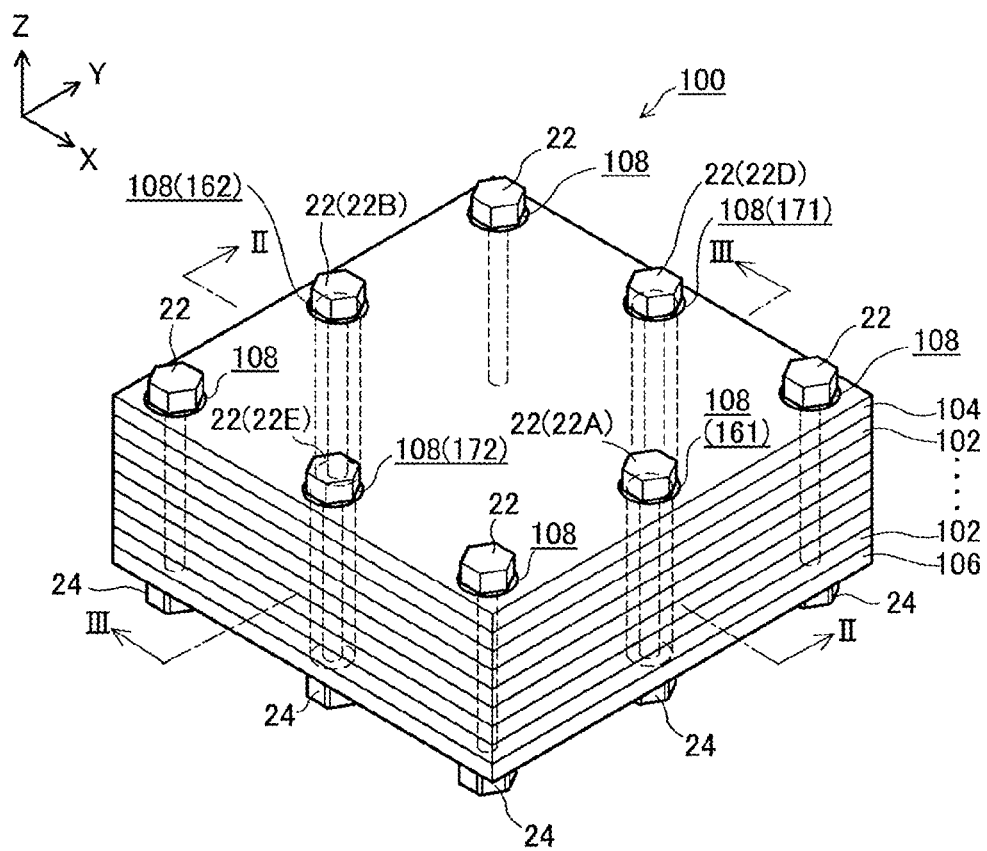
FIG. 1 Perspective view schematically showing the external appearance of a fuel cell stack 100.

FIG. 1 is a perspective view schematically showing the external appearance of a fuel cell stack 100. FIG. 1 shows mutually orthogonal X-axis, Y-axis, and Z-axis for specifying orientation. In the present specification, for convenience, the positive Z-axis direction is called the upward direction, and the negative Z-axis direction is called the downward direction; however, the fuel cell stack 100 may be disposed in a different orientation. The same also applies to FIG. 2 and subsequent drawings.

The fuel cell stack 100 includes a plurality of fuel cell electricity generation units (hereinafter, may be called merely the "electricity generation units") 102 disposed in a predetermined direction of array (in the vertical direction in the present embodiment) and a pair of end plates 104 and 106 disposed in such a manner as to hold the plurality of electricity generation units 102 from the vertical direction. The number of the electricity generation units 102 contained in the fuel cell stack 100 shown in FIG. 1 is a mere example and is determined as appropriate in accordance with a required output voltage of the fuel cell stack 100, etc. The direction of array (vertical direction) corresponds to the first direction.

The fuel cell stack 100 has a plurality of (eight in the present embodiment) through holes 108 formed in a peripheral portion about the Z-axis direction and extending therethrough in the vertical direction from the upper end plate 104 to the lower end plate 106. The constituent layers of the fuel cell stack 100 are clamped and fixed together by means of bolts 22 inserted through the respective through holes 108 and nuts 24 engaged with the bolts 22.

The outside diameter of a shaft portion of each bolt 22 is smaller than the inside diameter of each through hole 108. Accordingly, a space exists between the outer circumferential surface of the shaft portion of each bolt 22 and the inner circumferential surface of each through hole 108. A space defined by the bolt 22 (bolt 22A) and the through hole 108 located at around the midpoint of one side of the perimeter about the Z-axis direction of the fuel cell stack 100 (a side on the positive side of the X-axis direction of two sides in parallel with the Y-axis) functions as an oxidizer gas supply manifold 161 for supplying oxidizer gas (represented by "OG" in the drawings) to the electricity generation units 102, whereas a space defined by the bolt 22 (bolt 22B) and the through hole 108 located at around the midpoint of the other side opposite the above side (a side on the negative side of the X-axis direction of two sides in parallel with the Y-axis) functions as an oxidizer gas discharge manifold 162 for discharging unreacted oxidizer gas (hereinafter, called "oxidizer offgas," and represented by "OOG" in the drawings) from the electricity generation units 102 (see FIG. 2). A space defined by the bolt 22 (bolt 22D) and the through hole 108 located at around the midpoint of the other side of the perimeter about the Z-axis direction of the fuel cell stack 100 (a side on the positive side of the Y-axis direction of two sides in parallel with the X-axis) functions as a fuel gas supply manifold 171 for supplying fuel gas (represented by "FG" in the drawings) to the electricity generation units 102, whereas a space defined by the bolt 22 (bolt 22E) and the through hole 108 located at around the midpoint of the other side opposite the above side (a side on the negative side of the Y-axis direction of two sides in parallel with the X-axis) functions as a fuel gas discharge manifold 172 for discharging unreacted fuel gas (hereinafter, called "fuel offgas," and represented by "OFG" in the drawings) from the electricity generation units 102. In the present embodiment, for example, air is used as oxidizer gas, and hydrogen-rich gas reformed from city gas is used as fuel gas.

(Structure of End Plates 104 and 106)

The two end plates 104 and 106 are electrically conductive members each having a quadrate flat-plate shape and are formed of, for example, stainless steel. The end plates 104 and 106 have holes formed in their peripheral portions about the Z-axis and corresponding to the through holes 108 into which the above-mentioned bolts 22 are inserted respectively. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 (or another member connected to the upper end plate 104) functions as a positive output terminal of the fuel cell stack 100, and the lower end plate 106 (or another member connected to the lower end plate 106) functions as a negative output terminal of the fuel cell stack 100.

(Structure of Electricity Generation Unit 102)

Figure 2:
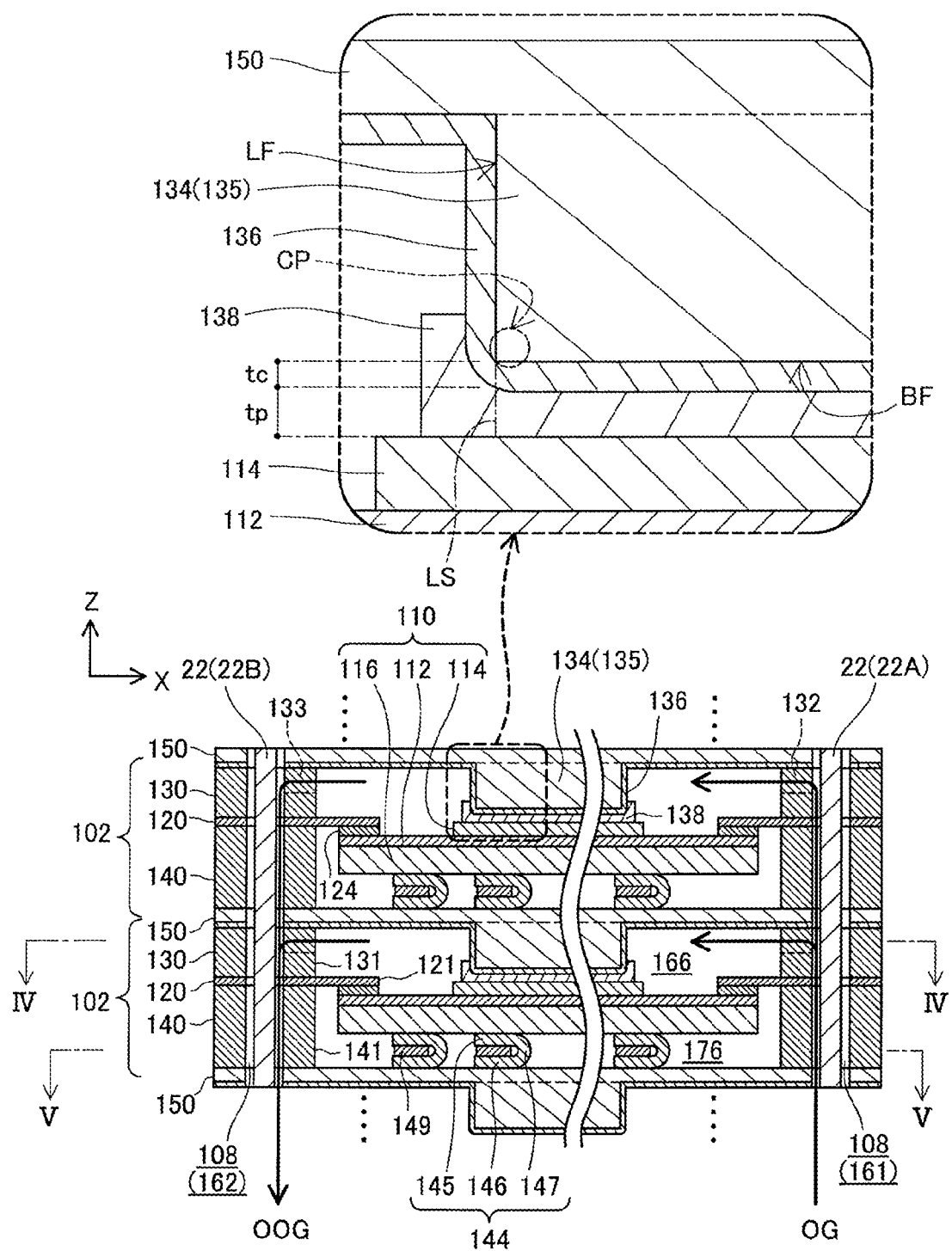
FIG. 2 Explanatory view (XZ section) schematically showing the structure of an electricity generation unit 102.
Figure 3:
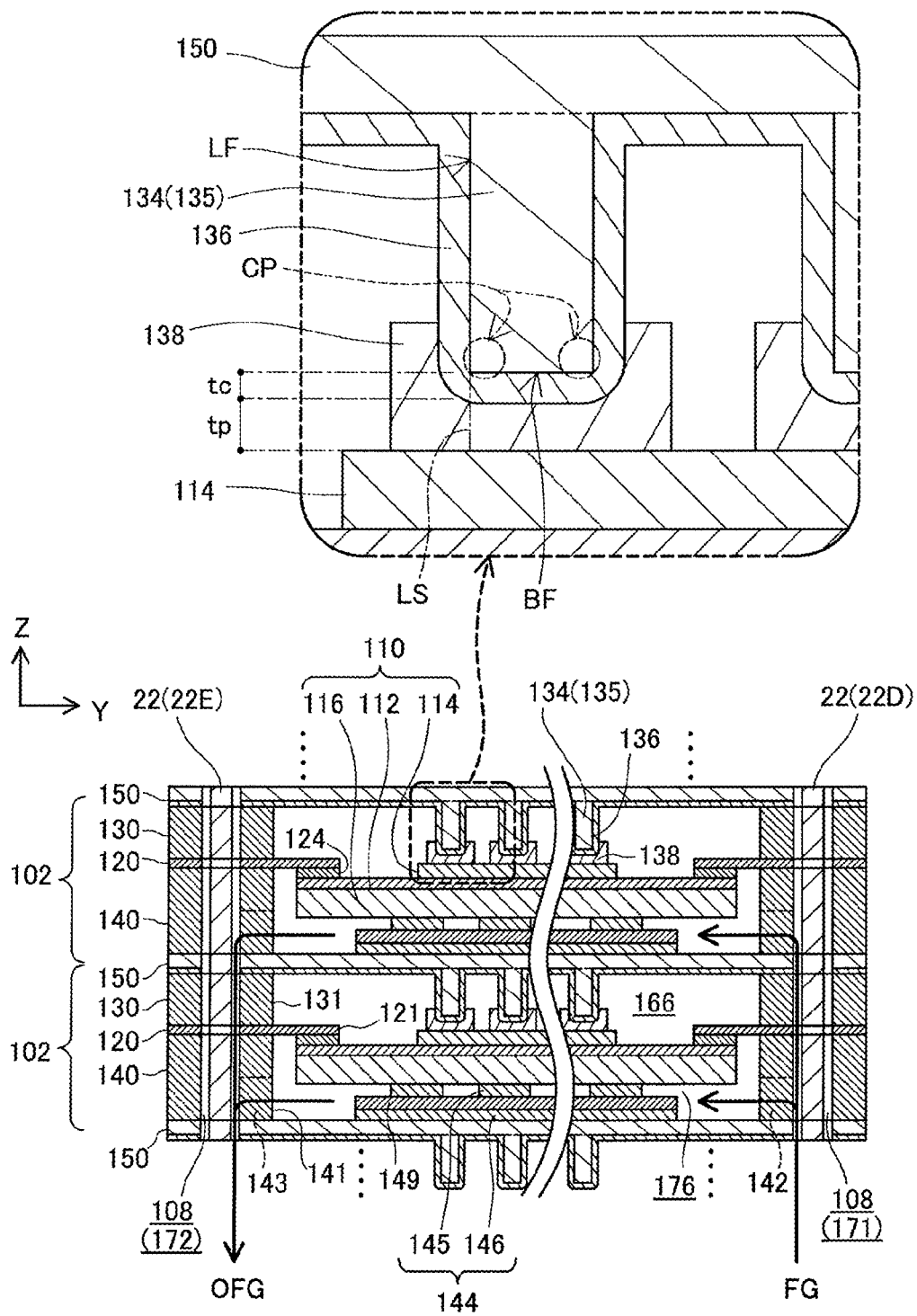
FIG. 3 Explanatory view (YZ section) schematically showing the structure of the electricity generation unit 102.
Figure 4:
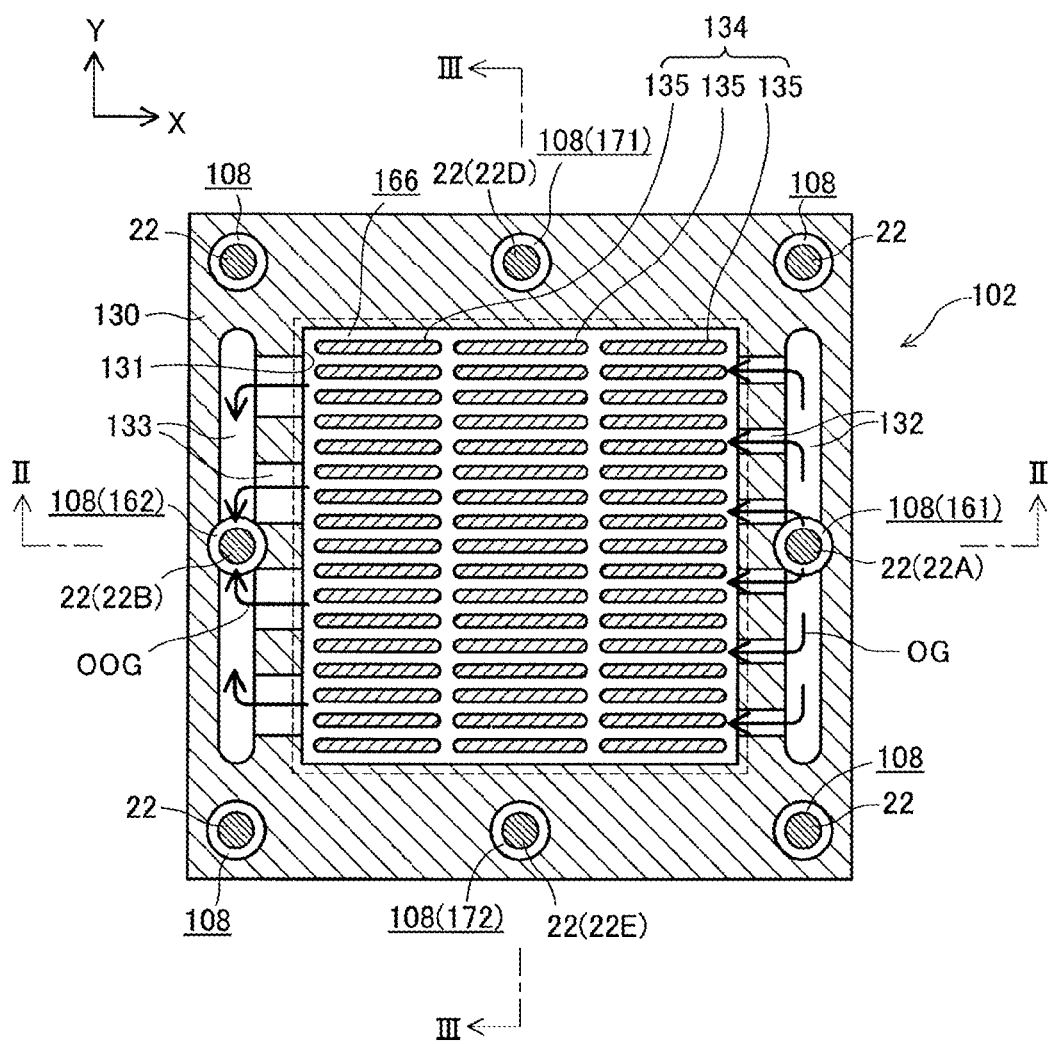
FIG. 4 Explanatory view (XY section) schematically showing the structure of the electricity generation unit 102.
Figure 5:
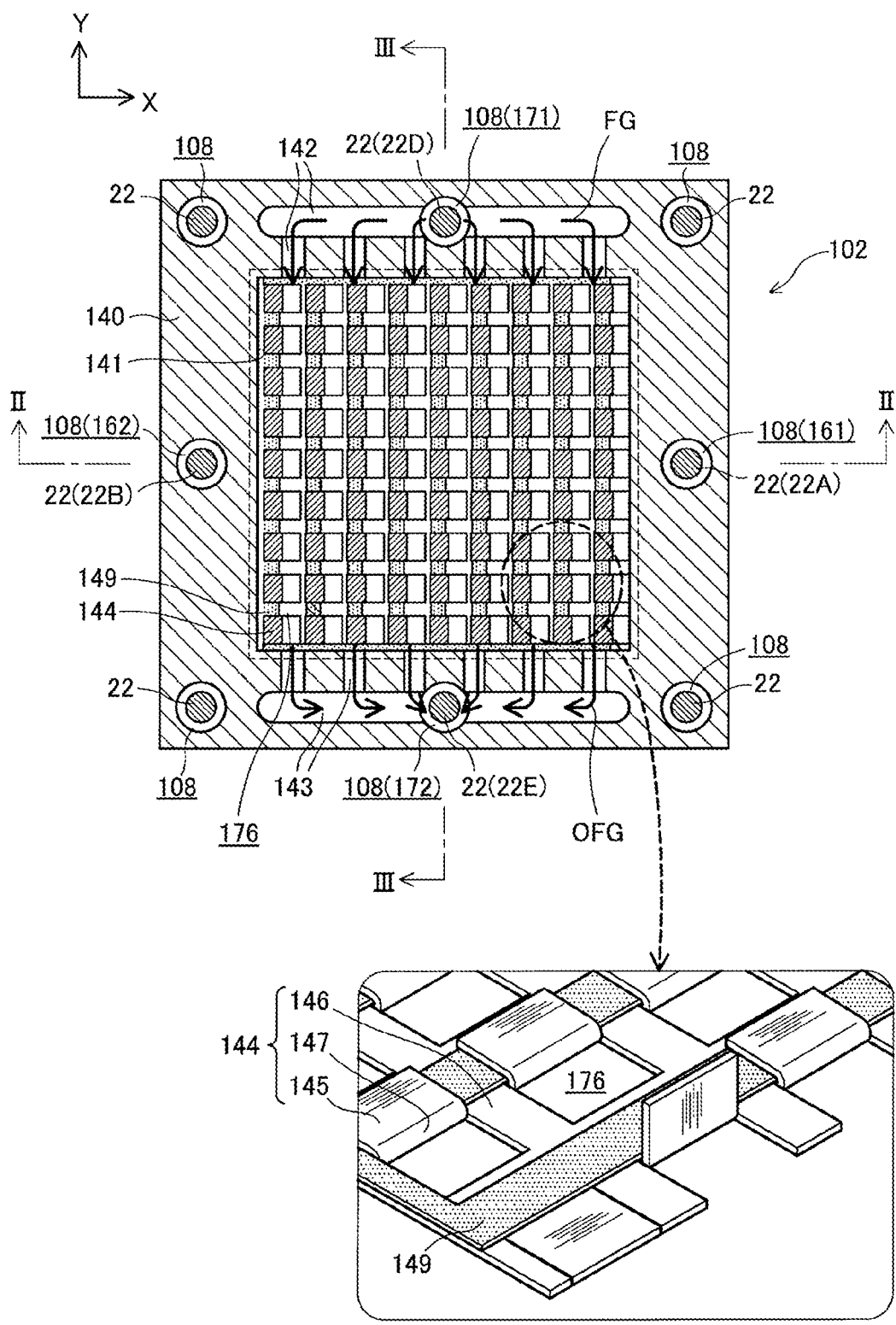
FIG. 5 Explanatory view (XY section) schematically showing the structure of the electricity generation unit 102.

FIGS. 2 to 5 are explanatory views schematically showing the structure of the electricity generation unit 102. FIG. 2 shows the sectional structure of the electricity generation unit 102 taken along the line II-II of FIGS. 1, and 5; FIG. 3 shows the sectional structure of the electricity generation unit 102 taken along the line III-III of FIGS. 1, 4, and 5; FIG. 4 shows the sectional structure of the electricity generation unit 102 taken along the line IV-IV of FIG. 2; and FIG. 5 shows the sectional structure of the electricity generation unit 102 taken along the line V-V of FIG. 2. Notably, each of FIGS. 2 and 3 shows the section of a portion on an enlarged scale.

As shown in FIGS. 2 and 3, the electricity generation unit 102 serving as the smallest unit of electricity generation includes a single cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. The separators 120, the cathode-side frames 130, the anode-side frames 140, and the interconnectors 150 have holes formed in their peripheral portions about the Z-axis and corresponding to the through holes 108 into which the above-mentioned bolts 22 are inserted respectively.

The interconnector 150 is an electrically conductive member having a quadrate flat-plate shape and is formed of, for example, a metal which contains Cr (chromium), such as ferritic stainless steel. The interconnector 150 secures electrical conductivity between the electricity generation units 102 and prevents mixing of gases between the electricity generation units 102. Two electricity generation units 102 share one interconnector 150. Specifically, the upper interconnector 150 of a certain electricity generation unit 102 serves as a lower interconnector 150 of the upper adjacent electricity generation unit 102. Also, since the fuel cell stack 100 has the two end plates 104 and 106, the upper interconnector 150 of the uppermost electricity generation unit 102 and the lower interconnector 150 of the lowermost electricity generation unit 102 can be eliminated.

The single cell 110 includes an electrolyte layer 112, and a cathode 114 and an anode 116 which face each other in the vertical direction with the electrolyte layer 112 intervening therebetween. The single cell 110 of the present embodiment is an anode-support-type single cell in which the anode 116 supports the electrolyte layer 112 and the cathode 114.

The electrolyte layer 112 is a member having a quadrate flat-plate shape and is formed of a solid oxide; for example, YSZ (yttria-stabilized zirconia), ScSZ (scandia-stabilized zirconia), SDC (samarium-doped ceria), GDC (gadolinium-doped ceria), or a perovskite-type oxide. The cathode 114 is a member having a quadrate flat-plate shape and smaller in size than the electrolyte layer 112 as viewed in the X-Y plane and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having a quadrate flat-plate shape and identical in size to the electrolyte layer 112 as viewed in the X-Y plane and is formed of, for example, Ni (nickel), a cermet of Ni and ceramic powder, or an Ni-based alloy. Thus, the single cell 110 of the present embodiment is a solid oxide fuel cell (SOFC) including the electrolyte layer 112 which contains a solid oxide.

The separator 120 is a frame member which has a quadrate through hole 121 formed in a central region thereof, and is formed of, for example, a metal. A portion of the separator 120 around the through hole 121 faces a peripheral portion of the surface on the cathode 114 side of the electrolyte layer 112. The separator 120 is bonded to the electrolyte layer 112 (single cell 110) by means of a bonding member 124 formed of a brazing material (e.g., Ag solder) and disposed between the facing portion and the electrolyte layer 112. The separator 120 separates the air chamber 166 which faces the cathode 114, and the fuel chamber 176 which faces the anode 116, from each other, thereby restraining gas leakage from one electrode side to the other electrode side. The single cell 110 to which the separator 120 is bonded is also called a separator-attached single cell.

As shown in FIGS. 2 to 4, the cathode-side frame 130 is a frame member which has a quadrate through hole 131 formed in a central region thereof, and is formed of, for example, an insulator such as mica. The cathode-side frame 130 is in contact with a peripheral portion of the surface on a side opposite the electrolyte layer 112 of the separator 120 and with a peripheral portion of the surface on a side toward the cathode 114 of the interconnector 150. The cathode-side frame 130 secures the air chamber 166 between the cathode 114 and the interconnector 150 and electrically insulates the two interconnectors 150 contained in the electricity generation unit 102 from each other. Also, the cathode-side frame 130 has an oxidizer gas supply communication hole 132 formed therein and adapted to establish communication between the oxidizer gas supply manifold 161 and the air chamber 166, and an oxidizer gas discharge communication hole 133 formed therein and adapted to establish communication between the air chamber 166 and the oxidizer gas discharge manifold 162.

As shown in FIGS. 2, 3, and 5, the anode-side frame 140 is a frame member which has a quadrate through hole 141 formed in a central region thereof, and is formed of, for example, a metal. The anode-side frame 140 is in contact with a peripheral portion of the surface on a side toward the electrolyte layer 112 of the separator 120 and with a peripheral portion of the surface on a side toward the anode 116 of the interconnector 150. The anode-side frame 140 secures the fuel chamber 176 between the anode 116 and the interconnector 150. Also, the anode-side frame 140 has a fuel gas supply communication hole 142 formed therein and adapted to establish communication between the fuel gas supply manifold 171 and the fuel chamber 176, and a fuel gas discharge communication hole 143 formed therein and adapted to establish communication between the fuel chamber 176 and the fuel gas discharge manifold 172.

As shown in FIGS. 2, 3, and 5, the anode-side current collector 144 is disposed within the fuel chamber 176. The anode-side current collector 144 includes an interconnector facing portion 146, a plurality of electrode facing portions 145, and connection portions 147 which connect the electrode facing portions 145 and the interconnector facing portion 146, and is formed of, for example, nickel, a nickel alloy, stainless steel, or the like. Specifically, the anode-side current collector 144 is manufactured by making cuts in a member having a quadrate flat-plate shape and then raising and bending a plurality of quadrate portions. The raised and bent quadrate portions become the electrode facing portions 145; a holed flat-plate portion other than the raised and bent portions becomes the interconnector facing portion 146; and portions which connect the electrode facing portions 145 and the interconnector facing portion 146 become the connection portions 147. The enlarged partial view in FIG. 5 shows a state before completion of the work of raising and bending some quadrate portions in order to show the method of manufacturing the anode-side current collector 144. The electrode facing portions 145 are in contact with the surface on a side opposite the electrolyte layer 112 of the anode 116, and the interconnector facing portion 146 is in contact with the surface on a side toward the anode 116 of the interconnector 150. As a result, the anode-side current collector 144 electrically connects the anode 116 and the interconnector 150. In the present embodiment, a spacer 149 formed of, for example, mica is disposed between the electrode facing portions 145 and the interconnector facing portion 146. As a result, the anode-side current collector 144 follows the deformation of the electricity generation unit 102 stemming from a temperature cycle and a pressure variation of reaction gas, thereby maintaining good electrical connection through the anode-side current collector 144 between the anode 116 and the interconnector 150.

As shown in FIGS. 2 to 4, the cathode-side current collector 134 is disposed within the air chamber 166. The cathode-side current collector 134 is composed of a plurality of current collector elements 135 each having a rectangular columnar shape and is formed of, for example, a metal which contains Cr (chromium), such as ferritic stainless steel. The cathode-side current collector 134 is in contact with the surface on a side opposite the electrolyte layer 112 of the cathode 114 and with the surface on a side toward the cathode 114 of the interconnector 150, thereby electrically connecting the cathode 114 and the interconnector 150. In the present embodiment, the cathode-side current collector 134 and the interconnector 150 are integrally formed as a unitary member. That is, a flat-plate-shape portion orthogonal to the vertical direction (Z-axis direction) of the unitary member functions as the interconnector 150, and a plurality of the current collector elements 135 protruding from the flat-plate-shape portion toward the cathode 114 collectively function as the cathode-side current collector 134. The cathode-side current collector 134 or a unitary member consisting of the cathode-side current collector 134 and the interconnector 150 is an example of the current collector. Also, the current collector elements 135 which constitute the cathode-side current collector 134 are collectively an example of the protrusions protruding toward the cathode 114.

As shown in FIGS. 2 and 3, the surface of the cathode-side current collector 134 is covered with an electrically conductive coat 136. The coat 136 is formed of a spinel oxide which contains at least one of Zn (zinc), Mn (manganese), Co (cobalt), and Cu (copper) (e.g., $Mn_{1.5}Co_{1.5}O_4$, $MnCo_2O_4$, $ZnCo_2O_4$, $ZnMnCoO_4$, or $CuMn_2O_4$). The coat 136 is formed on the surface of the cathode-side current collector 134 by a conventionally known method, such as spray coating, ink jet printing, spin coating, dip coating, plating, sputtering, or thermal spraying. As mentioned above, in the present embodiment, the cathode-side current collector 134 and the interconnector 150 are integrally formed as a unitary member. As a result, in actuality, a surface of the cathode-side current collector 134 serving as a boundary surface between the cathode-side current collector 134 and the interconnector 150 is not covered with the coat 136, whereas a surface of the interconnector 150 which faces at least the oxidizer gas flow channel (specifically, a surface of the interconnector 150 on a side toward the cathode 114, a surface of the interconnector 150 which faces the through hole 108 of the oxidizer gas supply manifold 161, a surface of the interconnector 150 which faces the through hole 108 of the oxidizer gas discharge manifold 162, etc.) is covered with the coat 136. In some cases, a chromic oxide film is formed as a result of thermal treatment on the cathode-side current collector 134; in this case, the coat 136 is not the chromic oxide film, but is a layer formed in such a manner as to cover the cathode-side current collector 134 on which the chromic oxide film is formed. In the following description, unless otherwise specified, the cathode-side current collector 134 (or the current collector element 135) means "the cathode-side current collector 134 (or the current collector element 135) covered with the coat 136."

The cathode 114 and the cathode-side current collector 134 are bonded together by an electrically conductive bonding layer 138. Similar to the coat 136, the bonding layer 138 is formed of a spinel oxide which contains at least one of Zn, Mn, Co, and Cu (e.g., $Mn_{1.5}Co_{1.5}O_4$, $MnCo_2O_4$, $ZnCo_2O_4$, $ZnMnCoO_4$, or $CuMn_2O_4$). In the present embodiment, the coat 136 and the bonding layer 138 are formed of respective spinel oxides which contain the same main component elements. The bonding layer 138 is formed, for example, as follows: paste used to form the bonding layer is applied, by printing, to those portions of the surface of the cathode 114 which face distal end portions of the current collector elements 135 constituting the cathode-side current collector 134, followed by firing under predetermined conditions in a state in which the distal end portions of the current collector elements 135 are pressed against the applied paste. The bonding layer 138 electrically connects the cathode 114 and the cathode-side current collector 134. It is mentioned above that the cathode-side current collector 134 is in contact with the surface of the cathode 114; however, precisely, the bonding layer 138 intervenes between the cathode 114 and the cathode-side current collector 134 (covered with the coat 136).

A-2. Generation of Electricity in Fuel Cell Stack 100:

As shown in FIG. 2, when the oxidizer gas OG is supplied to the oxidizer gas supply manifold 161, the oxidizer gas OG is supplied from the oxidizer gas supply manifold 161 to the air chambers 166 through the oxidizer gas supply communication holes 132 of the electricity generation units 102. Also, as shown in FIG. 3, when the fuel gas FG is supplied to the fuel gas supply manifold 171, the fuel gas FG is supplied from the fuel gas supply manifold 171 to the fuel chambers 176 through the fuel gas supply communication holes 142 of the electricity generation units 102.

When the oxidizer gas OG is supplied to the air chamber 166 of each electricity generation unit 102, whereas the fuel gas FG is supplied to the fuel chamber 176 of each electricity generation unit 102, the single 110 generates electricity through the electrochemical reaction between the oxidizer gas OG and the fuel gas FG. In each electricity generation unit 102, the cathode 114 of the single cell 110 is electrically connected to one interconnector 150 through the cathode-side current collector 134 (as well as the coat 136 and the bonding layer 138), whereas the anode 116 is electrically connected to the other interconnector 150 through the anode-side current collector 144. Also, a plurality of the electricity generation units 102 contained in the fuel cell stack 100 are connected in series. Accordingly, electric energy generated in the electricity generation units 102 is output from the end plates 104 and 106 which function as output terminals of the fuel cell stack 100. Notably, in the SOFC, since electricity is generated at a relatively high temperature (e.g., 700° C. to 1,000° C.), the fuel cell stack 100 may be heated by a heater from startup till the high temperature can be maintained by means of heat generated as a result of generation of electricity.

As shown in FIG. 2, the oxidizer offgas OOG (oxidizer gas not utilized for the electricity generating reaction in the electricity generation units 102) is discharged from the air chambers 166 to the outside of the fuel cell stack 100 through the oxidizer gas discharge communication holes 133 and the oxidizer gas discharge manifold 162. Also, as shown in FIG. 3, the fuel offgas OFG (fuel gas not utilized for the electricity generating reaction in the electricity generation units 102) is discharged from the fuel chambers 176 to the outside of the fuel cell stack 100 through the fuel gas discharge communication holes 143 and the fuel gas discharge manifold 172.

A-3. Detailed Structure of Cathode-Side Current Collector 134 and Bonding Layer 138:

As shown in FIGS. 2 and 3, in the sections, taken in parallel with the vertical direction, of the current collector elements 135 which constitute the cathode-side current collector 134, the bonding layer 138 is present in a region between the cathode 114 and the surface (hereinafter, called the "bottom surface BF") facing the cathode 114 of each current collector element 135 and extends, from the region, outward (in a direction orthogonal to the vertical direction) and further upward along a surface (hereinafter, called the "side surface LF") extending from the bottom surface BF of each current collector element 135 in a direction opposite the cathode 114. That is, the bonding layer 138 covers a corner portion CP of the current collector element 135 (covered with the coat 136). In a mode in which the bottom surface BF and a side surface LF are planes as shown in FIGS. 2 and 3, the corner portion CP of the current collector element 135 is a portion in the vicinity of the boundary between the bottom surface BF and the side surface LF. The expression "the bonding layer 138 covers the corner portion CP of the current collector element 135" means that the bonding layer 138 covers at least a portion of the side surface LF extending from the bottom surface BF of the current collector element 135 in addition to the bottom surface BF.

In the present embodiment, in any section of the current collector element 135 taken in parallel with the vertical direction, similar to the sections shown in FIGS. 2 and 3, the corner portion CP of the current collector element 135 is covered with the bonding layer 138. That is, as viewed from the cathode 114 side, the corner portion CP of the current collector element 135 is covered with the bonding layer 138 along the entire perimeter thereof. FIGS. 2 and 3 show the structure of part of the current collector elements 135 which constitute the cathode-side current collector 134; however, in the present embodiment, similarly, with respect to all the current collector elements 135 which constitute the cathode-side current collector 134, the corner portion CP of the current collector element 135 is covered with the bonding layer 138 along the entire perimeter thereof. Such a structure is implemented as follows: in manufacture of the fuel cell stack 100, paste used to form the bonding layer is applied, by means of printing, to the surface of the cathode 114 in regions corresponding to the bottom surfaces BF of the current collector elements 135 and in regions surrounding the former regions and each having a predetermined size, and the applied bonding layer paste is pressed by the bottom surfaces BF of the current collector elements 135 to thereby rise along the side surfaces LF of the current collector elements 135, followed by firing.

Figure 6:
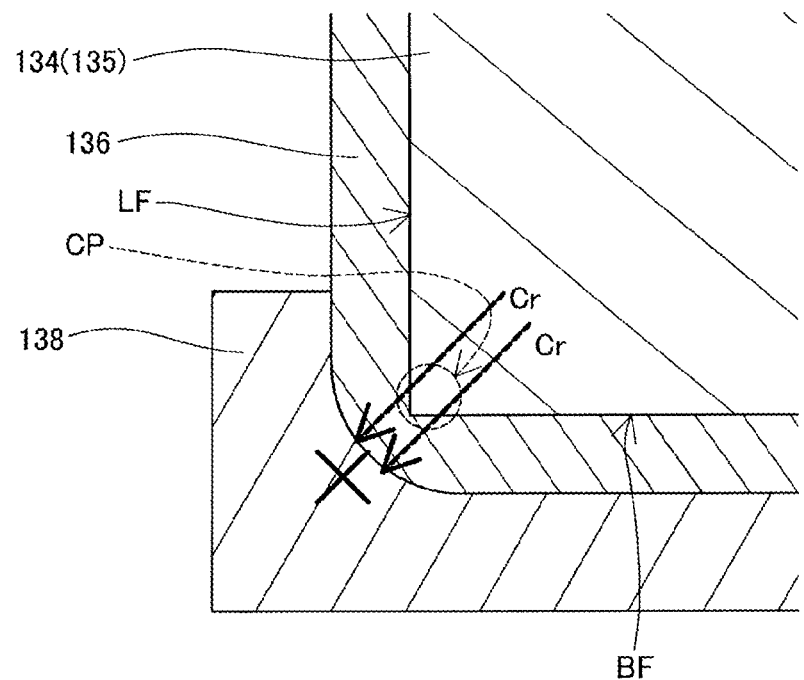
FIG. 6 Explanatory view showing the structure of a cathode-side current collector 134 and its vicinity.

As described above, in the fuel cell stack 100 of the present embodiment, in all sections, taken in parallel with the vertical direction, of each of the current collector elements 135 which constitute the cathode-side current collector 134, the corner portion CP of the current collector element 135 (covered with coat 136) is covered with the bonding layer 138. That is, the corner portions CP of the current collector elements 135 are covered with the respective bonding layers 138 along the entire perimeters thereof. As shown in FIG. 6, since the corner portion CP of the current collector element 135 has a portion of the side surface LF as well as a portion of the bottom surface BF, the corner portion CP has a larger number of diffusion surfaces as compared with the other portions of the current collector element 135. Also, the coat 136 which covers the current collector element 135 is apt to reduce in thickness at the corner portion CP. Particularly, this tendency is marked in the case of forming the coat 136 by spray coating, ink jet printing, spin coating, dip coating, plating, sputtering, thermal spraying, or the like. As a result, as indicated by the arrows in FIG. 6, Cr is apt to be emitted and diffused at the corner portion CP of the current collector element 135 as compared with the other portion of the current collector element 135. However, in the present embodiment, since the entire corner portions CP of the current collector elements 135 are covered with the respective bonding layers 138, even if Cr attempts to diffuse from the corner portions CP of the current collector elements 135 through the coat 136, the bonding layers 138 prevent Cr diffusion, so that Cr diffusion from the corner portions CP can be effectively restrained.

It is conceived that, for example, the corner portions CP of the current collector elements 135 are rendered greater in thickness of the coat 136 than the other portion for restraining Cr diffusion from the corner portions CP. However, in such a structure, in bonding the cathode 114 and the current collector elements 135 covered with the coat 136 by means of the respective bonding layers 138, the thicknesses of the bonding layers 138 become nonuniform; as a result, the cathode 114 and the current collector elements 135 covered with the coat 136 locally come into contact with each other, potentially resulting in deterioration in electrical conductivity, and the occurrence of cracking caused by stress concentration.

In the present embodiment, since the bonding layer 138 in addition to the coat 136 is formed of a spinel oxide highly effective at restraining Cr diffusion, the bonding layer 138 has the function of coat, whereby Cr diffusion from the corner portion CP of the current collector element 135 can be more effectively restrained. Also, since the heat treatment temperature can be lowered as compared with the case where the coat 136 and the bonding layer 138 are formed of other materials such as a perovskite-type oxide, Cr diffusion from the corner portion CP of the current collector element 135 can be more effectively restrained. Further, since both of the coat 136 and the bonding layer 138 are formed of a spinel oxide, a difference in thermal expansion between the coat 136 and the bonding layer 138 can be reduced, whereby the occurrence of cracking in the interface between the coat 136 and the bonding layer 138 caused by the difference in thermal expansion can be restrained. Also, as compared with the case where the coat 136 and the bonding layer 138 are formed of other materials, the coat 136 and the bonding layer 138 can be lowered in electric resistance.

In the present embodiment, the coat 136 and the bonding layer 138 are formed of respective spinel oxides which contain at least one of Zn, Mn, Co, and Cu. Since a spinel oxide which contains at least one of Zn, Mn, Co, and Cu can maintain a spinel structure for a long period of time even in a relatively high temperature environment, as a result of the coat 136 and the bonding layer 138 being formed of such a spinel oxide, the effect of restraining Cr diffusion from the corner portion CP of the current collector element 135 and the effect of lowering electric resistance can be maintained for a long period of time.

Further, in the present embodiment, the coat 136 and the bonding layer 138 are formed of respective spinel oxides which contain the same main component elements. Accordingly, a difference in thermal expansion between the coat 136 and the bonding layer 138 can be more reduced, whereby the occurrence of cracking in the interface between the coat 136 and the bonding layer 138 caused by the difference in thermal expansion can be restrained more effectively. The main component elements mean metal elements used to form a spinel oxide. A spinel oxide is identified by performing X-ray diffraction and ultimate analysis.

In the present embodiment, as shown in FIGS. 2 and 3, in a section of the current collector element 135 taken in parallel with the vertical direction, an average thickness tp of the bonding layer 138 is greater than an average thickness tc of the coat 136 as measured on a line segment LS connecting a point closest to the cathode 114 on the corner portion CP of the current collector element 135 and the surface of the cathode 114 along a shortest distance. In the present embodiment, in all sections of each of the current collector elements 135 taken in parallel with the vertical direction, the average thickness tp of the bonding layer 138 is greater than the average thickness tc of the coat 136 as measured on the line segment LS. Also, in the present embodiment, the coat 136 is lower in porosity than the bonding layer 138. As mentioned above, according to the present embodiment, since the average thickness tp of the bonding layer 138 higher in porosity than the coat 136 is greater than the average thickness tc of the coat 136, the effect of absorbing stress can be enhanced, whereby the occurrence of cracking in the interface between the coat 136 and the bonding layer 138 can be restrained more effectively.

The porosities of the members are specified in the following manner. The section of the electricity generation unit 102 is taken orthogonally to the direction of oxidizer gas flow (the X-axis direction in the present embodiment as shown in FIG. 2) at three positions juxtaposed along the direction of oxidizer gas flow. An SEM image (500 magnifications) carrying the cathode 114, the bonding layer 138, and the coat 136 is captured at three arbitrary positions in each of the three sections. That is, nine SEM images are obtained. In each of the obtained SEM images, a plurality of straight lines orthogonal to the stacking direction of the electricity generation units 102 (the Z-axis direction in the present embodiment) are drawn at predetermined intervals (for example, 1 μm-5 μm intervals). Pores on each of the straight lines are measured for length. The ratio of the total length of the pores to the overall length of the straight line is taken as porosity on the straight line. The average of porosities on a plurality of straight lines drawn on each of the members (cathode 114, bonding layer 138, and coat 136) is taken as the porosity of each member in the SEM image. The porosities of each member obtained in the nine SEM images are averaged, thereby yielding the final porosity of each member.

The average thicknesses of the coat 136 and the bonding layer 138 as measured on the line segment LS connecting a point closest to the cathode 114 on the corner portion CP of the current collector element 135 (protrusion) and the surface of the cathode 114 along a shortest distance can be obtained in the following manner. First, sectional images (e.g., SEM images) parallel to the stacking direction of the electricity generation units 102 (the Z-axis direction in the present embodiment) are taken in such a manner that the sectional images contain the current collector element 135, the coat 136, the bonding layer 138, and the cathode 114. For example, the sectional images (five images) can be taken at such positions as to divide the overall length of the current collector element 135 along a direction perpendicular to the sections into six approximately equal parts. The number of sectional images can be changed according to the size of the current collector element 135, for example. The sectional images are to be taken at such a plurality of positions as to divide the overall length of the current collector element 135 into approximately equal parts. The sectional image is used to measure the lengths of the coat 136 and the bonding layer 138 on the line segment LS connecting a point closest to the cathode 114 on the corner portion CP of the current collector element 135 and the surface of the cathode 114 along a shortest distance. The measured lengths are taken as the thicknesses of the coat 136 and the bonding layer 138. Such measurement of thickness is performed for the plurality of (five, for example) sectional images. The arithmetical mean of the thicknesses of the coat 136 obtained from the plurality of sectional images is taken as the average thickness tc, and the arithmetical mean of the thicknesses of the bonding layer 138 obtained from the plurality of sectional images is taken as the average thickness tp.

B. Modifications

The technique disclosed in the present specification is not limited to the above embodiment, but may be modified to various other forms without departing from the gist thereof; for example, the following modifications are possible.

Figure 7:
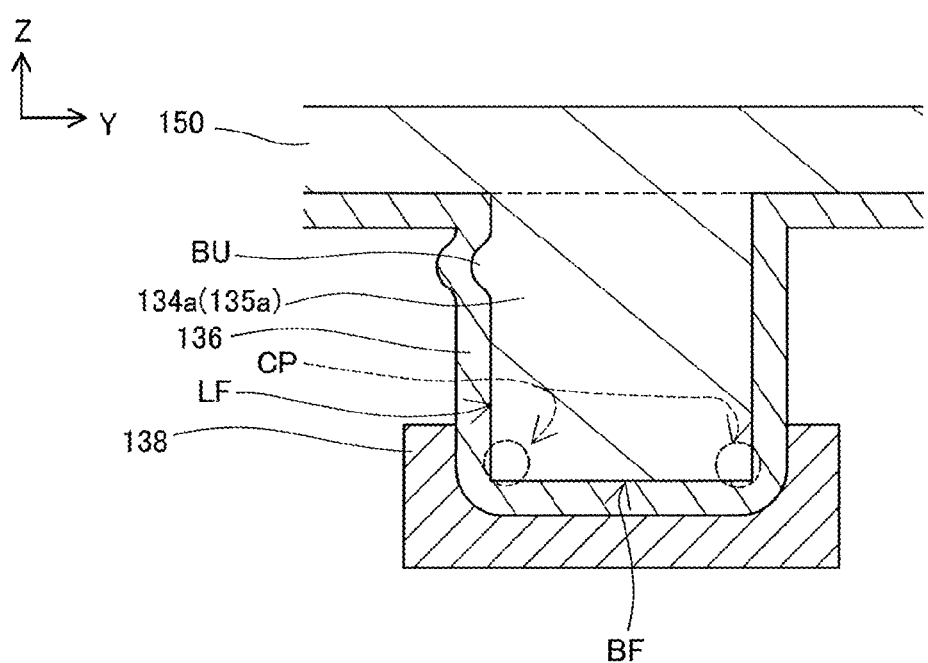
FIG. 7 Explanatory view showing the structure of a cathode-side current collector 134a and its vicinity in a modification.

In the above embodiment, as shown in FIGS. 2 and 3, the bottom surface BF and the side surface LF of each of the current collector elements 135 constituting the cathode-side current collector 134 are each a single flat surface, but are not necessarily assume such a form. FIG. 7 is an explanatory view showing the structure of a cathode-side current collector 134a and its vicinity in a modification. FIG. 7 shows a section of the cathode-side current collector 134a and its vicinity taken in parallel with the Z-axis and the Y-axis. The same also applies to FIGS. 8 to 11 to be described later. In the modification shown in FIG. 7, a bump BU is present on the side surface LF of each of current collector elements 135a constituting the cathode-side current collector 134a. In the present modification also, the corner portion CP of the current collector element 135a is a portion in the vicinity of the boundary between the bottom surface BF and the side surface LF. In the structure shown in FIG. 7, since a portion of the side surface LF of the current collector element 135a is covered with the bonding layer 138, the corner portion CP of the current collector element 135a can be said to be covered with the bonding layer 138.

Figure 8:
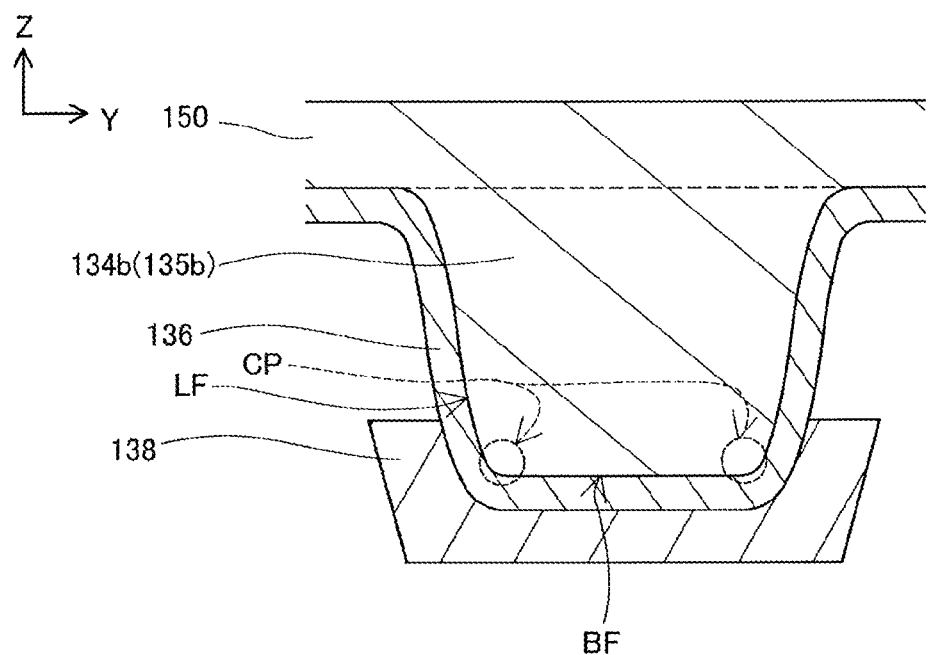
FIG. 8 Explanatory view showing the structure of a cathode-side current collector 134b and its vicinity in another modification.

FIG. 8 is an explanatory view showing the structure of a cathode-side current collector 134b and its vicinity in another modification. In the modification shown in FIG. 8, the side surface LF of each of current collector elements 135b constituting the cathode-side current collector 134b is a curved surface rather than a flat surface. A portion of the side surface LF of the current collector element 135b in the vicinity of the boundary between the side surface LF and the bottom surface BF is an outwardly convex curved surface. In the present modification also, the corner portion CP of the current collector element 135b is a portion of the current collector element 135b in the vicinity of the boundary between the bottom surface BF and the side surface LF. In the structure shown in FIG. 8, since a portion of the side surface LF of the current collector element 135b is covered with the bonding layer 138, the corner portion CP of the current collector element 135b can be said to be covered with the bonding layer 138.

Figure 9:
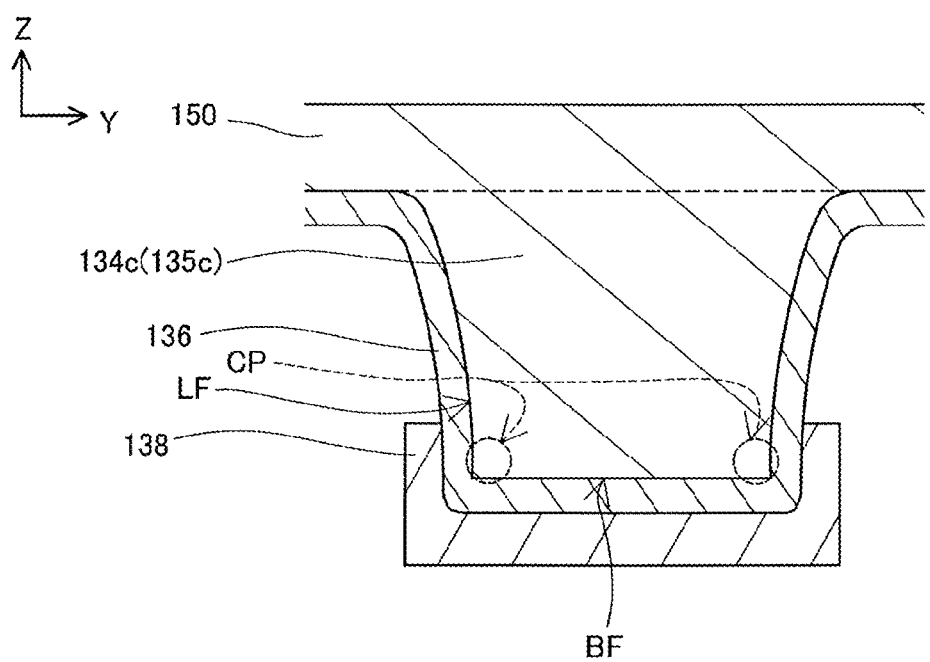
FIG. 9 Explanatory view showing the structure of a cathode-side current collector 134c and its vicinity in a further modification.

FIG. 9 is an explanatory view showing the structure of a cathode-side current collector 134c and its vicinity in a further modification. In the modification shown in FIG. 9, the side surface LF of each of current collector elements 135c constituting the cathode-side current collector 134c is a curved surface rather than a flat surface. A portion of the side surface LF of the current collector element 135c in the vicinity of the boundary between the side surface LF and the bottom surface BF is an inwardly convex curved surface. In the present modification also, the corner portion CP of the current collector element 135c is a portion of the current collector element 135c in the vicinity of the boundary between the bottom surface BF and the side surface LF. In the structure shown in FIG. 9, since a portion of the side surface LF of the current collector element 135c is covered with the bonding layer 138, the corner portion CP of the current collector element 135c can be said to be covered with the bonding layer 138.

Figure 10:
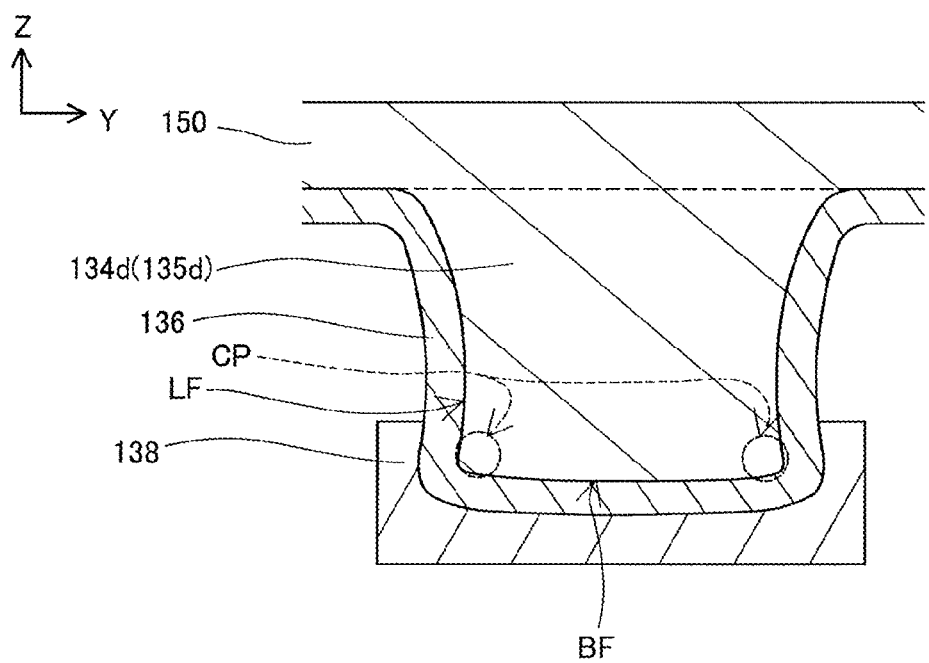
FIG. 10 Explanatory view showing the structure of a cathode-side current collector 134d and its vicinity in a still further modification.

FIG. 10 is an explanatory view showing the structure of a cathode-side current collector 134d and its vicinity in a still further modification. In the modification shown in FIG. 10, the side surface LF and the bottom surface BF of each of current collector elements 135d constituting the cathode-side current collector 134d are curved surfaces rather than planes. A portion of the side surface LF of the current collector element 135d in the vicinity of the boundary between the side surface LF and the bottom surface BF is an inwardly convex curved surface. Also, a portion of the bottom surface BF of the current collector element 135d in the vicinity of the boundary between the bottom surface BF and the side surface LF is an outwardly convex curved surface. In the present modification also, the corner portion CP of the current collector element 135d is a portion of the current collector element 135d in the vicinity of the boundary between the bottom surface BF and the side surface LF. In the structure shown in FIG. 10, since a portion of the side surface LF of the current collector element 135d is covered with the bonding layer 138, the corner portion CP of the current collector element 135d can be said to be covered with the bonding layer 138.

Figure 11:
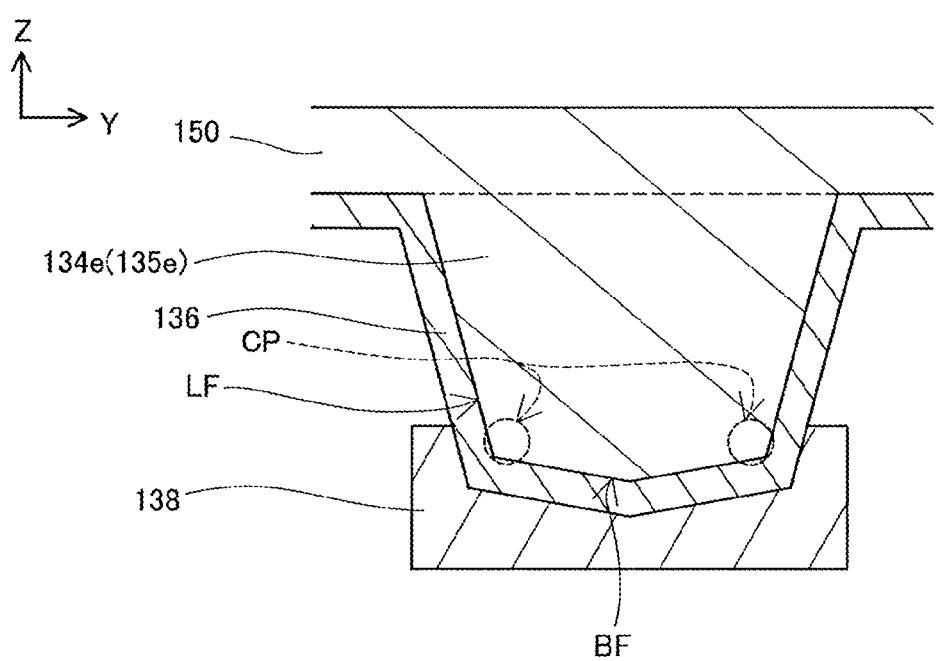
FIG. 11 Explanatory view showing the structure of a cathode-side current collector 134e and its vicinity in a yet another modification.

FIG. 11 is an explanatory view showing the structure of a cathode-side current collector 134e and its vicinity in a yet another modification. In the modification shown in FIG. 11, the bottom surface BF of each of current collector elements 135e constituting the cathode-side current collector 134e is a curved surface rather than a flat surface. The bottom surface BF of the current collector element 135e is composed of a single flat or curved surface or a plurality of flat or curved surfaces and assumes a form of a downwardly convex surface as a whole. In the present modification also, the corner portion CP of the current collector element 135e is a portion of the current collector element 135e in the vicinity of the boundary between the bottom surface BF and the side surface LF. In the structure shown in FIG. 11, since a portion of the side surface LF of the current collector element 135e is covered with the bonding layer 138, the corner portion CP of the current collector element 135e can be said to be covered with the bonding layer 138.

Figure 12:
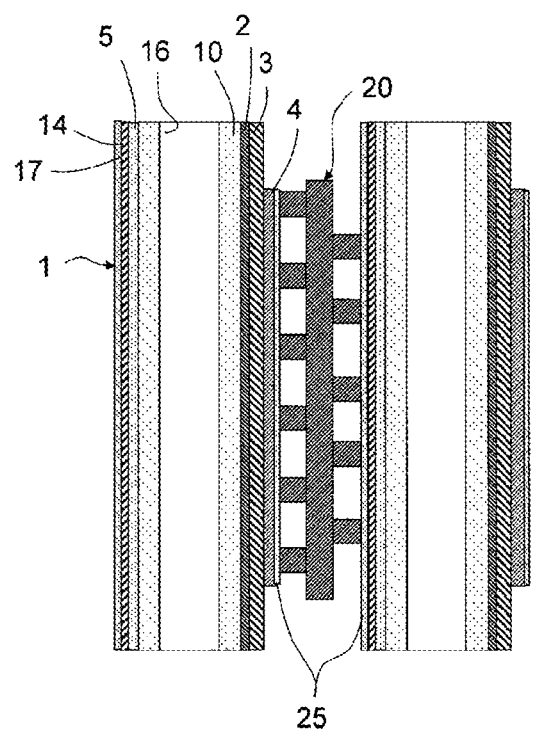
FIG. 12 Explanatory view schematically showing the structure of a fuel cell stack in another modification.
Figure 13:
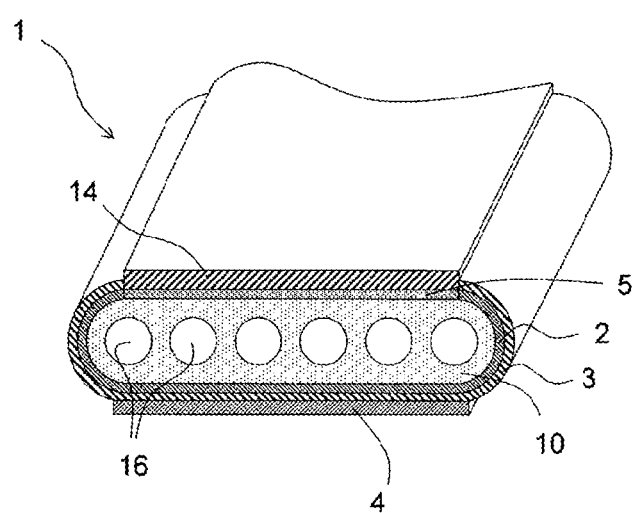
FIG. 13 Explanatory view schematically showing the structure of a fuel cell 1 of the fuel cell stack in the another modification.

In the above embodiment, the fuel cell stack 100 has a structure in which a plurality of the flat electricity generation units 102 are stacked. However, the present invention can be similarly applied to other structures, for example, a structure in which a plurality of approximately cylindrical single fuel cells are connected in series as described in Japanese Patent Application Laid-Open (kokai) No. 2008-59797. FIG. 12 is an explanatory view schematically showing the structure of a fuel cell stack in another modification, and FIG. 13 is an explanatory view schematically showing the structure of a fuel cell 1 of the fuel cell stack in the another modification. As shown in FIGS. 12 and 13, the fuel cellstack in the present modification includes a plurality of hollow flat fuel cells 1 and current collectors 20. The fuel cell 1 includes a hollow flat-plate-like support substrate 10, a porous anode 2 provided around the hollow flat-plate-like support substrate 10, a dense electrolyte layer 3, a porous cathode 4, a dense interconnector 5, and cathode material layer 14. The support substrate 10 has a plurality of fuel gas channels 16 extending therethrough in a direction (a cell length direction) intersecting with the stacking direction of the fuel cells 1. The current collector 20 is joined to the cathode 4 of one fuel cell 1 by a bonding layer 25 and to the cathode material layer 14 of the other adjacent fuel cell 1 by the bonding layer 25, whereby a plurality of the fuel cells 1 are electrically connected in series. Oxidizer gas is supplied to the outside of the cathodes 4; fuel gas is supplied into the fuel gas channels 16 within the support substrates 10; and the fuel cell stack is heated to a predetermined operating temperature, whereby the fuel cell stack generates electricity.

Figure 14:
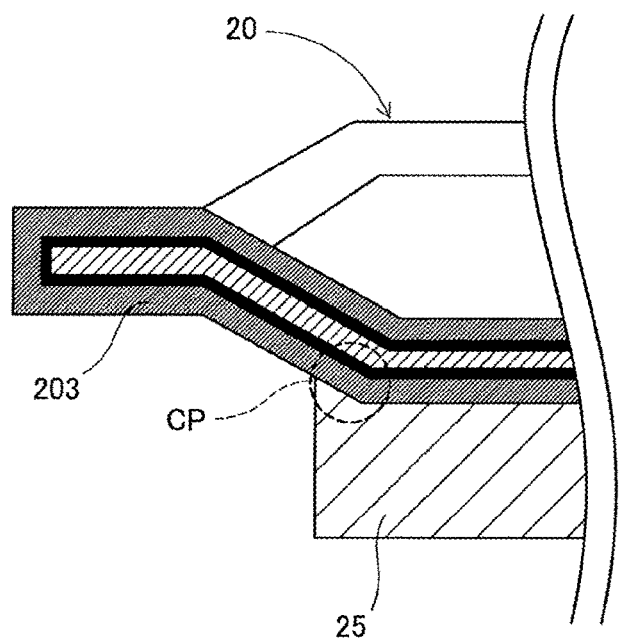
FIG. 14 Explanatory view showing the detailed structure of a current collector 20 in the fuel cell stack of the another modification shown in FIGS. 12 and 13.
Figure 15:
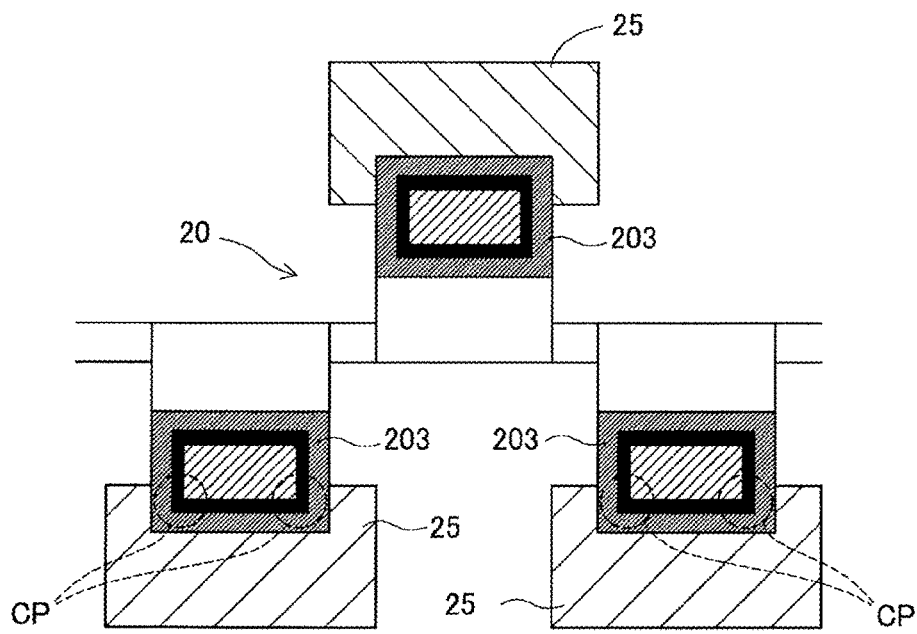
FIG. 15 Explanatory view showing the detailed structure of the current collector 20 in the fuel cell stack of the another modification shown in FIGS. 12 and 13.
Figure 16:
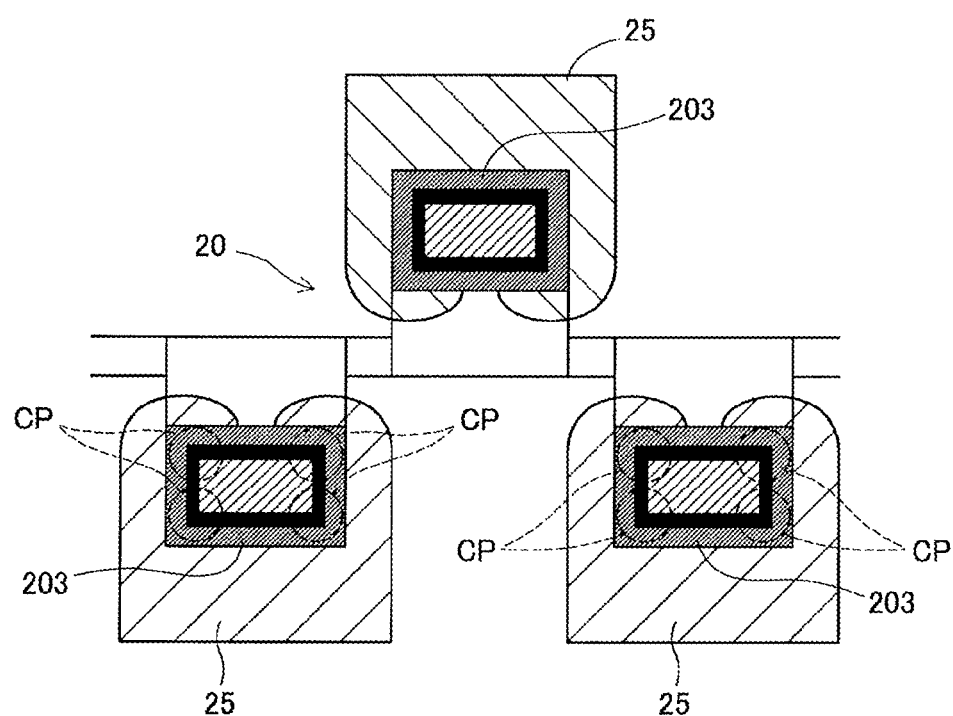
FIG. 16 Explanatory view showing a modification of the current collector 20 in the fuel cell stack of the another modification shown in FIGS. 12 and 13.

FIGS. 14 and 15 are explanatory views showing the detailed structure of the current collector 20 in the fuel cell stack of the another modification shown in FIGS. 12 and 13. In FIGS. 14 and 15, the cathode 4 of the fuel cell 1 is to be disposed under the current collector 20. The current collector 20 is formed of, for example, a metal which contains Cr and is covered with a coat 203 whose surface is electrically conductive. As shown in FIGS. 14 and 15, the corner portions CP located on a side toward the cathode 4 of protrusions of the current collector 20 protruding toward the cathode 4 are covered with the bonding layer 25. Accordingly, even if Cr attempts to diffuse from the corner portions CP of the protrusions of the current collector 20 through the coat 203, the bonding layers 25 prevent Cr diffusion from the corner portions CP located on the side toward the cathode 4. Thus, Cr diffusion from the corner portions CP can be effectively restrained. FIG. 16 is an explanatory view showing a modification of the current collector 20 in the fuel cell stack of the another modification shown in FIGS. 12 and 13. In the modification shown in FIG. 16, all of the corner portions CP of protrusions protruding toward the cathode 4 of the current collector 20 are covered with the respective bonding layers 25. Employment of such a structure is more preferred, since Cr diffusion from the corner portions CP of protrusions of the current collector 20 can be restrained more effectively.

The above embodiment refers to SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2014-207120, detailed description thereof is omitted, but schematically, the electrolysis cell stack has a structure similar to that of the fuel cell stack 100 in the above embodiment. That is, the fuel cell stack 100 in the above embodiment may be read as "electrolysis cell stack," and the electricity generation unit 102 may be read as "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the through hole 108. As a result, the electrolysis of water occurs in the electrolysis cell units, whereby hydrogen gas is generated in the fuel chambers 176, and hydrogen is discharged to the outside of the electrolysis cell stack through the through hole 108. Even in the electrolysis cell unit and the electrolysis cell stack having the above respective structures, similar to the above embodiment, through employment of a structure in which in all sections, taken in parallel with the vertical direction, of each of the current collector elements 135 constituting the cathode-side current collector 134, the corner portion CP of the current collector element 135 is covered with the bonding layer 138, Cr diffusion from the corner portion CP can be effectively restrained.

In the above embodiment (or the above modifications; the same also applies in the following description), with respect to all the electricity generation units 102 (or all the electrolysis cell units; the same also applies in the following description) contained in the fuel cell stack 100 (or the electrolysis cell stack; the same also applies in the following description), in all sections, taken in parallel with the vertical direction, of each of the current collector elements 135 constituting the cathode-side current collector 134, the corner portion CP is covered with the bonding layer 138. However, if at least one electricity generation unit 102 contained in the fuel cell stack 100 has such a structure, in the electricity generation unit(s) 102 concerned, Cr diffusion from the corner portion(s) CP of the current collector element(s) 135 is restrained. Also, if at least one of the current collector elements 135 constituting the cathode-side current collector 134 has such a structure, Cr diffusion from the corner portion(s) CP of the current collector element(s) 135 concerned is restrained.

In the above embodiment, the coat 136 and the bonding layer 138 are formed of respective spinel oxides which contain the same main component. However, the coat 136 and the bonding layer 138 may be formed of respective spinel oxides which differ in the main component. Also, in the above embodiment, the coat 136 and the bonding layer 138 are formed of respective spinel oxides which contain at least one of Zn, Mn, Co, and Cu. However, the coat 136 and the bonding layer 138 may be formed of respective spinel oxides which do not contain these elements. Also, in the above embodiment, the coat 136 and the bonding layer 138 are formed of respective spinel oxides. However, the coat 136 and the bonding layer 138 may be formed of another material such as a perovskite-type oxide.

In the above embodiment, the electrolyte layer 112 is formed of a solid oxide. However, the electrolyte layer 112 may contain other substances in addition to a solid oxide. Also, in the above embodiment, materials used to form the members are provided merely by way of example. Other materials may be used to form the members. For example, in the above embodiment, the cathode-side current collector 134 is formed of a metal which contains Cr; however, the cathode-side current collector 134 may be formed of another material so long as the cathode-side current collector 134 is covered with the coat 136. Also, the shape of each current collector element 135 of the cathode-side current collector 134 is not limited to a rectangular columnar shape, but may be another shape so long as the shape such that each current collector element 135 protrudes toward the cathode 114 from the interconnector 150 side.

In the above embodiment, a reaction preventive layer which contains ceria, for example, may be provided between the electrolyte layer 112 and the cathode 114 for restraining an increase in the electric resistance between the electrolyte layer 112 and the cathode 114, which would otherwise result from reaction between zirconium, etc., contained in the electrolyte layer 112 and strontium, etc., contained in the cathode 114. Also, in the above embodiment, the cathode-side current collector 134 and the adjacent interconnector 150 may be formed as separate members. The anode-side current collector 144 may have a structure similar to that of the cathode-side current collector 134, and the anode-side current collector 144 and the adjacent interconnector 150 may be integrally formed as a unitary member. The anode-side frame 140 rather than the cathode-side frame 130 may be an insulator. Also, the cathode-side frame 130 and the anode-side frame 140 may have a multilayer structure.

In the above embodiment, the end plates 104 and 106 function as output terminals. However, instead of the end plates 104 and 106, electrically conductive plates disposed respectively between the end plate 104 and the electricity generation unit 102 and between the end plate 106 and the electricity generation unit 102 may be used as output terminals. Also, in the above embodiment, spaces between the outer circumferential surfaces of shaft portions of the bolts 22 and the inner circumferential surfaces of the through holes 108 are utilized as manifolds. However, axial holes may be formed in the bolts 22 for use as the manifolds, or the manifolds may be provided separately from the through holes 108 into which the bolts 22 are inserted.

DESCRIPTION OF REFERENCE NUMERALS

1: fuel cell; 2: anode; 3: electrolyte layer; 4: cathode; 5: interconnector; 10: support substrate; 14: cathode material layer; 16: fuel gas channel; 20: current collector; 22: bolt; 24: nut; 25: bonding layer; 100: fuel cell stack; 102: fuel cell electricity generation unit; 104: end plate; 106: end plate; 108: through hole; 110: single cell; 112: electrolyte layer; 114: cathode; 116: anode; 120: separator; 121: through hole; 124: bonding member; 130: cathode-side frame; 131: through hole; 132: oxidizer gas supply communication hole; 133: oxidizer gas discharge communication hole; 134: cathode-side current collector; 135: current collector element; 136: coat; 138: bonding layer; 140: anode-side frame; 141: through hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas supply manifold; 162: oxidizer gas discharge manifold; 166: air chamber; 171: fuel gas supply manifold; 172: fuel gas discharge manifold; 176: fuel chamber; and 203: coat.

The invention claimed is:

1. An electrochemical reaction unit comprising:
a single cell including an electrolyte layer containing solid oxide, and a cathode and an anode which face each other in a first direction with the electrolyte layer intervening therebetween;
a current collector disposed on a cathode side of the single cell and having a flat portion and a protrusion protruding toward the cathode, the protrusion including a side surface and a bottom surface;
an electrically conductive coat covering an entire surface of the flat portion and the protrusion of the current collector; and
an electrically conductive bonding layer bonding the cathode and the protrusion covered with the coat;
the electrochemical reaction unit being characterized in that in all sections of the protrusion when viewed from a cross-sectional view in the first direction, a corner portion of the protrusion including a portion of the side surface and a portion of the bottom surface covered with the coat is covered with the bonding layer, and
wherein the bonding layer is formed of a spinel oxide which contains at least one of Zn, Mn, Co, and Cu.

2. An electrochemical reaction unit according to claim 1, wherein
the current collector has a plurality of the protrusions, and
in all sections of each of the plurality of protrusions taken in parallel with the first direction, the corner portion of the protrusion covered with the coat is covered with the bonding layer.

3. An electrochemical reaction unit according to claim 1, wherein the coat is formed of a spinel oxide.

4. An electrochemical reaction unit according to claim 3, wherein the coat is formed of a spinel oxide which contains at least one of Zn, Mn, Co, and Cu.

5. An electrochemical reaction unit according to claim 3, wherein the coat and the bonding layer are formed of respective spinel oxides which contain the same main component elements.

6. An electrochemical reaction unit according to claim 1, wherein
in all sections of the protrusion taken in parallel with the first direction, the bonding layer has an average thickness greater than an average thickness of the coat, as measured on a line segment connecting a point closest to the cathode on the corner portion of the protrusion and a surface of the cathode along a shortest distance, and
the coat is lower in porosity than the bonding layer.

7. An electrochemical reaction unit according to claim 1, wherein the electrolyte layer, the cathode, and the anode have a flat-plate shape.

8. An electrochemical reaction unit according to claim 1, wherein the electrochemical reaction unit is a fuel cell electricity generation unit for generating electricity.

9. A fuel cell stack comprising a plurality of fuel cell electricity generation units, wherein at least one of the plurality of fuel cell electricity generation units is an electrochemical reaction unit according to claim 8.

10. An electrochemical reaction unit according to claim 1, wherein
the current collector has a plurality of the protrusions, and
the bonding layer which bonds one of the protrusions to the cathode and the bonding layer which bonds another of the protrusions to the cathode are independent of each other.

* * * * *